United States Patent [19]

Tadakuma et al.

[11] 3,942,085
[45] Mar. 2, 1976

[54] CONTROL APPARATUS OF DC MOTORS

[75] Inventors: Susumu Tadakuma; Junpei Inagaki, both of Yokohama; Shigeru Tanaka, Kamakura, all of Japan

[73] Assignee: Agency of Industrial Science & Technology, Tokyo, Japan

[22] Filed: Sept. 19, 1974

[21] Appl. No.: 507,352

[30] Foreign Application Priority Data

Sept. 22, 1973 Japan............................ 48-106525
Sept. 22, 1973 Japan............................ 48-106526

[52] U.S. Cl. .................. 318/341; 318/345; 323/23
[51] Int. Cl.² ........................................... H02P 7/36
[58] Field of Search ......... 318/341, 345; 322/23, 25

[56] References Cited

UNITED STATES PATENTS

| 3,372,329 | 3/1968 | Steimel et al. ................. 318/345 X |
| 3,593,088 | 7/1971 | Pantelakis et al. ............. 318/345 X |

*Primary Examiner*—G. Z. Rubinson
*Attorney, Agent, or Firm*—Charles E. Pfund

[57] ABSTRACT

In apparatus for controlling the speed of a DC motor by the ON-OFF control of a switching transistor, a pair of switching transistors are connected in series with the motor and the switching transistors controlled such that while one of them is rendered ON the other is rendered from ON to OFF and sequentially from OFF to ON.

8 Claims, 6 Drawing Figures

CONTROL APPARATUS OF DC MOTORS

BACKGROUND OF THE INVENTION

This invention relates to control apparatus of direct current motors, and more particularly to control apparatus utilizing semiconductor switches such as power transistors or thyristors.

According to one prior art DC motor control apparatus, a DC motor is connected to a source of direct current through a semiconductor switch, as shown in FIG. 1 and the speed of the motor is controlled by means of a control device which relatively controls the ON period and OFF period of the semiconductor switch thereby to control the motor armature voltage. However, with such connection large power is consumed by the semiconductor switch so that it is necessary to use transistors of relatively large size.

SUMMARY OF THE INVENTION

It is an object of this invention to provide an improved control apparatus of a DC motor which can decrease the loss of the switch means, such as power transistors or thyristors and hence decrease the temperature rise of the switch means.

Another object of this invention is to provide an improved control apparatus which enables ON-OFF control of the switch means at a higher frequency than the prior art system thus reducing the size of the DC reactor ususally connected in series with the motor.

Still another object of this invention is to provide an improved control signal generator for controlling the ON-OFF operation of the switch means connected between a source of DC and a DC motor.

Yet another object of this invention is to provide an improved control apparatus of a DC motor capable of providing a powering operation as well as a regenerative operation of the motor at high efficiencies.

According to this invention, there is provided a control apparatus of a DC motor of the type wherein the power supplied to the motor from a source of supply is controlled by the ON-OFF control of switch means, there are provided a pair of switch means which are connected in series through the source therebetween and control means for alternately rendering ON and OFF the switch means such that while one switch means is rendered ON, the other switch means is rendered from ON to OFF and sequentially from OFF to ON.

According to one form the control means generates a pair of pulsating rectangular waves which are dephased 180°. According to a modified embodiment the control means generates a pair of control signals each comprising spaced apart rectangular waves recurring at a predetermined frequency and a plurality of pulses having a higher frequency than said rectangular waves and interposed between the rectangular waves, the pair of control signals being dephased by 180°.

BRIEF DESCRIPTION OF THE DRAWINGS

Further objects and advantages of the invention will be more fully understood from the following detailed description taken in conjunction with the accompanying drawings in which.

DESCRIPTION OF THE PREFERRED EMBODIMENTS

Figure 1:
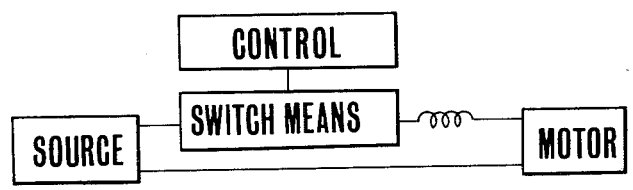
FIG. 1 is a block diagram showing a prior art DC motor control apparatus.
Figure 2:
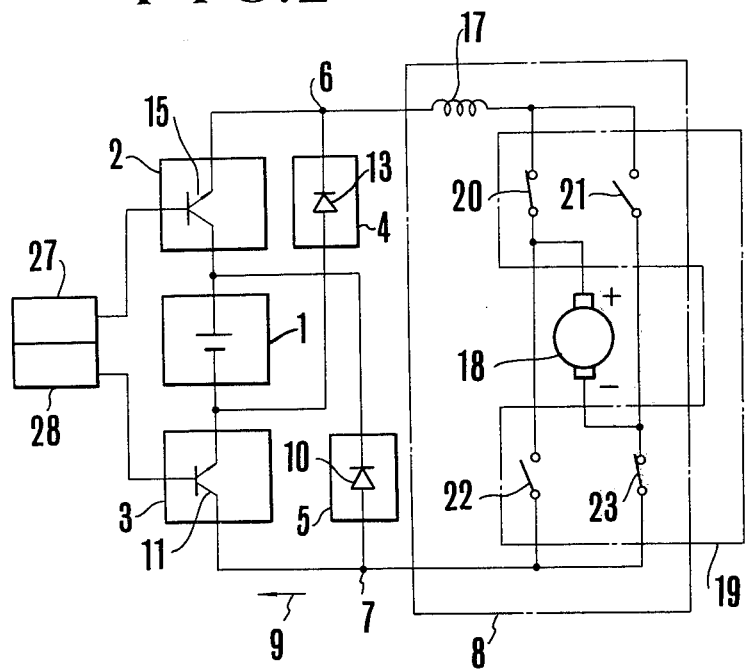
FIG. 2 is a connection diagram of one embodiment of this invention.

A preferred embodiment of the DC motor control apparatus embodying the invention shown in FIG. 2 comprises a DC source, shown as a battery 1, first and second switch means 2 and 3 which are connected in series with the source 1 therebetween, a first rectifier 4 connected in parallel with a first series connection including the source 1 and the first switch means 2, and a second rectifier 5 connected in parallel with a second series connection including the source 1 and the second switch means 3. Across the output terminals 6 and 7 of the switch means 2 and 3 is connected a load circuit 8. The polarities of the switch means and rectifiers are selected such that direct current flows through the load circuit 8 always in a definite direction as shown by arrow 9.

Suppose now that power transistors are used as the switch means and that diodes as the rectifiers, the anode electrode of diode 13 comprising the first rectifier 4 is connected to the emitter electrode of transistor 11 comprising the second switch means 3 and to the negative pole of the source 1. The cathode electrode of diode 10 comprising the second rectifier 5 and the collector electrode of transistor 15 comprising the first switch means 2 are connected to the positive pole of the source 1. The load circuit 8 comprises a smoothing reactor 17, a DC motor 18 (not shown: a field winding and a control device thereof) and a polarity changer 19. The polarity changer 19 may be a well known electronic switch comprising four thyristors, but in the example illustrated it comprises four interlocked mechanical switches 20, 21, 22 and 23. Thus, when switches 20 and 23 are closed and switches 21 and 22 are open the motor 18 rotates in the forward direction whereas when switches 21 and 22 are closed and switches 20 and 23 are open the motor rotates in the reverse direction.

Figure 3:
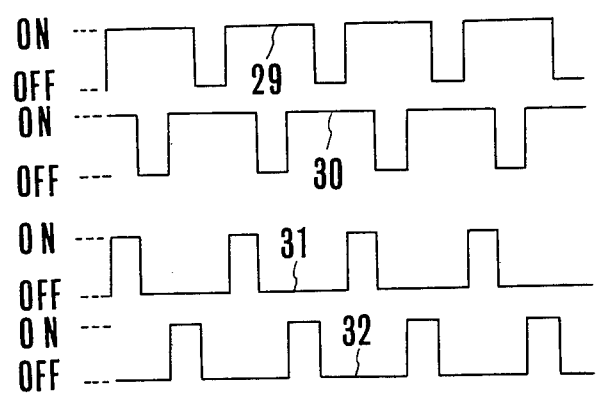
FIG. 3 is a graph useful to explain the operation of this invention.

The transistors 15 and 11 comprising the first and second switch means 2 and 3 are ON-OFF controlled by control devices 27 and 28 connected to the respective base electrodes. The control devices 27, 28 may comprise a combination of logic circuits such as flip-flop circuits, and generate control signals as shown in FIG. 3. One example of the logic circuit will be described later in connection with FIG. 4. As shown in FIG. 3, for the powering operation of the motor, control devices 27 and 28 generate control signals 29 and 30 wherein the switches 20 and 23 are closed and for the regenerating operation control devices 27 and 28 generate control signals 31 and 32 wherein the switches 21 and 22 are closed. Although in the illustrated example, the frequency of the control signals is 500 Hz, it will be clear that other frequencies can also be used.

The operation of the control apparatus of this invention is as follows.

1. Powering

Assume now that switches 20 and 23 are closed and switches 21 and 22 are open. Under these conditions transistors 11 and 15 are ON-OFF controlled at a frequency of 500 Hz. However, as shown in FIG. 3, transistor 11 is controlled such that it is rendered from ON to OFF and sequentially from OFF to ON while transistor 15 is ON and vice versa. In other words, while one transistor is ON, the other transistor is firstly rendered ON, then OFF and again ON.

When both transistors 11 and 15 are ON, the source 1 supplies current to a circuit including transistor 15, reactor 17, switch 20, motor 18, switch 23 and transistor 11. As the transistor 15 turns OFF, the electromagnetic energy stored in the reactor 17 causes a current to flow through a closed circuit including switch 20, motor 18, switch 23, transistor 11, diode 13 and reactor 17. Under these conditions, diode 13 acts as a flywheeling diode. Then, both transistors 11 and 15 are again rendered ON to repeat the same operation. At this time, however, the transistor 11 is sequentially rendered ON, OFF and ON while transistor 15 is maintained ON so that diode 10 acts as a flywheeling diode.

2. Regeneration

When switches 20 and 23 are open and switches 21 and 22 are closed and when the motor 18 generates a back electromotive force of a polarity shown in FIG. 2, control devices 27 and 28 apply control signals 31 and 32 as shown in FIG. 3 upon the base electrodes of transistors 15 and 11, respectively. More particularly, when transistor 15 is ON and transistor 11 is OFF, the back electromotive force of the motor causes a short circuit current to flow through a closed circuit including motor 18, switch 22, diode 10, transistor 15, reactor 17 and switch 21, thereby storing an electromagnetic energy in reactor 17. Then, when both transistors 11 and 15 are rendered OFF, the electromagnetic energy stored in the reactor acts cumulatively with the back electromotive force thus passing a regenerative current through a closed circuit including reactor 17, switch 21, motor 18, switch 22, diode 10, source 1 and diode 13 whereby the source is charged by the regenerated current. When transistor 11 alone is ON, the back electromotive force of the motor 18 is short circuited by a closed circuit including motor 18, switch 22, transistor 11, diode 13, reactor 17 and switch 21 whereby the energy is stored in the reactor 17. Then both transistors 15 and 11 are rendered OFF and the operation described above is repeated.

Figure 4:
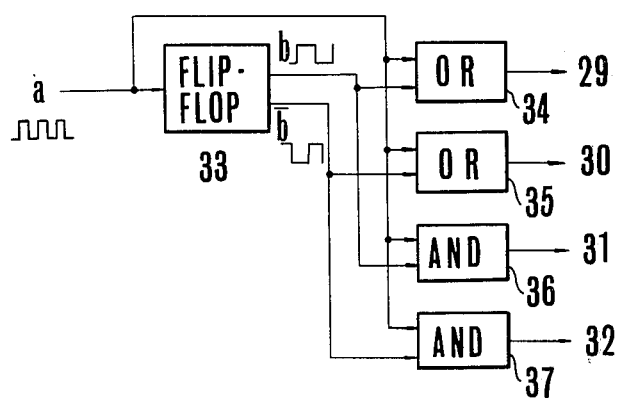
FIG. 4 shows a connection diagram of a logic circuit utilized to generate control signals and FIGS. 5 and 6 show waveforms of modified control signals for the powering operation and the regenerative operation respectively.

Control signals 29, 30, 31 and 32 for transistors 11 and 15 are generally formed by a circuit as shown in FIG. 4 where a pulse signal $a$ having a frequency of 1000 Hz, for example, is applied to the input terminal of a flipflop circuit 33 so that two signals $b$ and $\bar{b}$ having 500 Hz and 180° dephased from each other are produced on the output terminals of the flip-flop circuit 33. Signals $a$, $b$ and $\bar{b}$ are applied to the inputs of OR gate circuits 34 and 35 and AND gate circuits 36 and 37 for producing control signals 29, 30, 31 and 32. Thus, for example, control signal 29 is produced by applying signals $a$ and $b$ to the inputs of the OR gate circuit 34.

As described above, according to this invention since a plurality of switch means are alternately operated the losses of the switching means are averaged so that the burden or temperature rise of each switch means is decreased as compared with a case wherein only a single switch means is used. Accordingly, it is possible to increase the overload capacity of respective switch means. For this reason, it is possible to increase the operating frequency of the switch means two times thereby miniaturizing the smoothing reactor, and other component elements.

Figure 5:
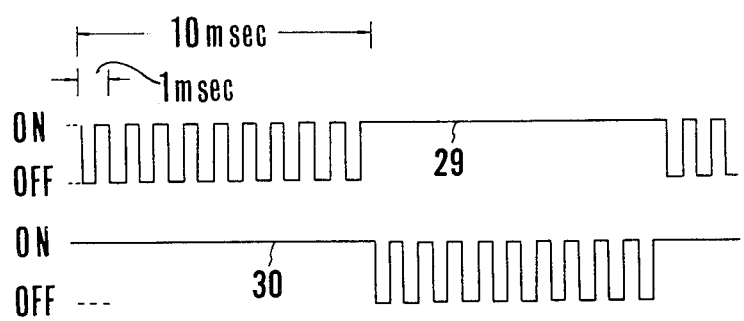
Figure 6:
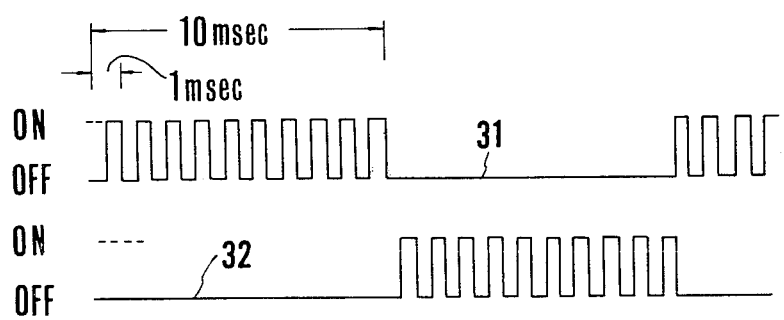

FIGS. 5 and 6 show waveforms of control signals having a frequency of 1000 Hz generated by control devices 27 and 28 for alternately ON-OFF controlling the switch means 2 and 3 at a frequency of 100 Hz. FIG. 5 shows control signals 29 and 30 for the powering operation whereas FIG. 6 shows control signals 31 and 32 for the regenerative operation. When these control signals are used while transistor 11 is continuously maintained ON for an interval of 10 m.sec. the other transistor 15 is ON-OFF controlled at a period of 1 m.sec., thus controlling the speed of the motor by the pulse signal $a$. During the next interval of 10 m.sec., transistor 15 is continuously maintained ON and transistor 11 is ON-OFF controlled at a period of 1 m.sec. In other respects, the operation is identical to that described above.

It will be clear that the frequency of the control signal and that of the ON-OFF operation of the switch means can be selected to any desired value by taking into consideration the application of the motor and other factors.

Further transistors may be substituted by thyristors or grid controlled electron devices.

What is claimed is:

1. In control apparatus for a DC motor of the type wherein the power supplied to said motor from a direct current source of supply is controlled by the ON-OFF control of switch means, the improvement which comprises first and second switch means which are connected in series between said source and said motor, a first rectifier connected in parallel with a first series connection including said source and said first switch means, a second rectifier connected in parallel with a second series connection including said source and said second switch means, a smoothing reactor connected between said first switch means and said motor, and control means supplying said first and second switch means with control signals such that while one of said switch means is rendered ON the other switch means is rendered from ON to OFF and sequentially from OFF to ON.

2. The control apparatus according to claim 1 wherein said switch means comprise first and second controllable semiconductor elements respectively, and said first and second rectifiers comprise diodes.

3. The control apparatus according to claim 2 wherein said first and second controllable semiconductor elements comprise NPN transistors, the emitter electrode of said first NPN transistor connected to said smoothing reactor and the collector to the positive pole of said source, the emitter electrode of the second NPN transistor connected to the negative pole of said source and the collector to one pole of said motor, the cathode electrode of said first diode connected to said smoothing reactor and the anode to the emitter electrode of said second NPN transistor, and the cathode electrode of said second diode connected to the positive pole of said source and the anode to the collector electrode of said second NPN transistor.

4. The control apparatus according to claim 1 which further comprises a polarity changing switch for reversing the polarity of the voltage for connecting said motor to said source.

5. The control apparatus according to claim 1 wherein said control means apply control signals to said switch means such that while one switch means is rendered continuously conductive, the other switch means is ON-OFF controlled at a frequency higher than that at which said one switch means is rendered continuously conductive.

6. The control apparatus according to claim 5 wherein each control signal comprises spaced apart rectangular waves and a plurality of pulses having a larger frequency than that of said rectangular waves and interposed between said rectangular waves, and wherein the rectangular waves of one control signal for controlling one switch means is 180° out of phase with respect to the rectangular waves of the other control signal for controlling the other switch means.

7. The control apparatus according to claim 4 wherein said polarity changing switch comprises first, second, third and fourth switches, wherein said first and second switches are connected in series to form a third series connection and said third and fourth switches connected in series to form a fourth series connection, one end of each said third and fourth series connection connected in common to the first switch means through said smoothing reactor and the other end connected in common to the second switch means, and wherein said motor is connected between a juncture of said first and second switches and a juncture of said third and fourth switches, whereby during the powering operation, said first and fourth switches are open whereas during the regeneration operation the operational relationship of said switches is reversed.

8. In a control apparatus for a DC motor of the type wherein the power supplied to said motor from a direct current source is controlled by an ON-OFF switch control, the improvement which comprises first and second switch means which are connected in series between said source and said motor, and control means supplying said first and second switch means with control signals such that while one of said switch means is rendered ON the other switch means is rendered from ON to OFF and subsequently from OFF to ON, said control means comprising a source of a pulse of a predetermined frequency, a flip-flop circuit responsive to said pulse for producing output pulses of opposite phase, said output pulses having a frequency one half of said first mentioned pulse, and a plurality of OR gate circuits and AND gate circuits responsive to said first mentioned pulse and said output pulses for producing control signals for performing ON-OFF control of said switch means.

* * * * *